United States Patent
Cho et al.

(10) Patent No.: US 9,822,875 B2
(45) Date of Patent: Nov. 21, 2017

(54) SHIFTING CONTROL METHOD FOR VEHICLE WITH DCT

(71) Applicants: Hyundai Motor Company, Seoul (KR); Kia Motors Corp., Seoul (KR)

(72) Inventors: Sung Hyun Cho, Yongin-si (KR); Hwan Hur, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 426 days.

(21) Appl. No.: 14/667,958

(22) Filed: Mar. 25, 2015

(65) Prior Publication Data

US 2016/0123465 A1 May 5, 2016

(30) Foreign Application Priority Data

Nov. 3, 2014 (KR) .................. 10-2014-0151375

(51) Int. Cl.
| | |
|---|---|
| *F16H 63/46* | (2006.01) |
| *F16D 13/38* | (2006.01) |
| *F16H 61/688* | (2006.01) |
| *F16H 61/04* | (2006.01) |

(52) U.S. Cl.
CPC .......... *F16H 63/46* (2013.01); *F16D 13/385* (2013.01); *F16H 61/0437* (2013.01); *F16H 61/688* (2013.01)

(58) Field of Classification Search
CPC .... F16H 63/46; F16H 61/0437; F16H 61/688; F16D 13/385
See application file for complete search history.

(56) References Cited

U.S. PATENT DOCUMENTS

| | | | | |
|---|---|---|---|---|
| 2015/0337952 | A1* | 11/2015 | Cho | B60W 10/10 701/54 |
| 2016/0123465 | A1* | 5/2016 | Cho | F16H 63/46 477/176 |
| 2016/0138713 | A1* | 5/2016 | Cho | F16H 63/46 701/53 |
| 2016/0377129 | A1* | 12/2016 | Cho | F16D 48/068 701/51 |

FOREIGN PATENT DOCUMENTS

| | | |
|---|---|---|
| JP | 2009-8148 A | 1/2009 |
| KR | 10-2010-0089221 A | 8/2010 |
| KR | 10-2011-0109022 A | 10/2011 |
| KR | 10-2013-0060071 A | 6/2013 |
| KR | 10-2014-0034548 A | 3/2014 |

* cited by examiner

*Primary Examiner* — David J Hlavka
(74) *Attorney, Agent, or Firm* — Morgan, Lewis & Bockius LLP

(57) ABSTRACT

A shifting control method for a vehicle with a Double Clutch Transmission (DCT), may include determining whether a manual range power-on up shift has been started, determining whether an actual shifting period has been started, when the manual range power-on up shift has been started, and applying additional predetermined compensation torque to basic torque applied to an engagement-side clutch, when the actual shifting period has been started.

6 Claims, 2 Drawing Sheets

SHIFTING CONTROL METHOD FOR VEHICLE WITH DCT

CROSS REFERENCE TO RELATED APPLICATION

The present application claims priority of Korean Patent Application Number 10-2014-0151375 filed on Nov. 3, 2014, the entire contents of which application are incorporated herein for all purposes by this reference.

BACKGROUND OF THE INVENTION

Field of the Invention

The present invention generally relates to a shifting control method for a vehicle with a Double Clutch Transmission (DCT), and, more particularly, to a control method in manual power-on up shift.

Description of Related Art

In general, it is important to shift as smoothly as possible in vehicles with an automatic transmission that shifts using a torque converter and a planetary gear set. Accordingly, shifting can be controlled with control features maintained as strictly as possible, even if a shift lever is positioned within a D range or a Manual range. Obviously, the actual shifting time is made different to make the D range and the Manual range feel different, even in vehicles with an automatic transmission. Accordingly, a driver feels shifting to be slightly lighter when shifting within the Manual range in comparison to shifting within the D range.

However, vehicles with a DCT automatically shift like vehicles with an automatic transmission, and basically have the mechanism of a manual transmission, so they offer the same possibilities of manual shifting as do vehicles with a manual transmission; as some customers want these dual shifting characteristics.

Accordingly, similar to vehicles with a common automatic transmission, in order to make D range shifting and Manual range shifting qualitatively different in vehicles with a DCT, in addition to making actual shifting time different, the present invention addresses a specific control method for achieving the same shifting response as in vehicles with a manual transmission.

That is, the present invention has been designed to achieve the unique and sporty shifting response of a vehicle with a DCT which cannot be implemented in vehicles with an automatic transmission, by controlling shifting so as to implement an actual shifting period that is as short and as light as possible, in power-on up shift in which a driver wants to shift to an upper gear while pressing down on the acceleration pedal from within a manual range.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shifting control method for a vehicle with a DCT that can further improve commercial value of a vehicle by achieving the unique and sporty shifting response of a vehicle with a DCT, which cannot be implemented in vehicles with an automatic transmission, by controlling shifting to implement an actual shifting period which is as short and light as possible, in power-on up shift in which a driver wants to shift to an upper gear while pressing down on the acceleration pedal from a manual range, in addition to making actual shifting time different so as to make a D range and Manual range qualitatively different in terms of shifting characteristics in a vehicle with a DCT.

In an aspect of the present invention, a shifting control method for a vehicle with a Double Clutch Transmission (DCT), may include determining by the controller, whether a manual range power-on up shift may have been started, determining by the controller, whether an actual shifting period may have been started, when the manual range power-on up shift may have been started, and applying by the controller, additional predetermined compensation torque to basic torque applied to an engagement-side clutch, when the actual shifting period may have been started.

The applying of the additional predetermined compensation torque ramps up the compensation torque to a desired compensation torque and ramps down the compensation torque until shifting is finished.

The desired compensation torque is determined in accordance with a degree to which an acceleration pedal is pressed down by a driver and an amount of slip that is a difference between a rotation speed of an engine and a rotation speed of an input shaft of an engagement-side when actual shifting starts.

The desired compensation torque is determined in proportion to a degree to which an acceleration pedal is pressed down by a driver and an amount of slip that is a difference between a rotation speed of an engine and a rotation speed of an input shaft of an engagement-side when actual shifting starts.

The applying of the additional predetermined compensation torque may include determining by the controller, the desired compensation torque, when the determining of whether the actual shifting period may have been started determines that the actual shifting period may have been started, ramping up compensation torque toward the desired compensation torque determined in the determining of the desired compensation torque, maintaining by the controller, the desired compensation torque until estimated remaining synchronization time decreases to under a predetermined reference time, when the compensation torque reaches the desired compensation torque, and removing by the controller, the compensation torque until synchronization is finished by decreasing the compensation torque after the maintaining of the desired compensation torque.

The reference time that is a criterion of determining whether to maintain the desired compensation torque is set on a basis of a level where the compensation torque becomes zero by performing the removing of the compensation torque, until a rotation speed of the engine and a rotation speed of the input shaft of the engagement-side are synchronized.

According to the shifting control method for a vehicle with a DCT, it is possible to further improve commercial value of a vehicle by achieving the unique and sporty shifting response of a vehicle with a DCT, which cannot be implemented in vehicles with an automatic transmission, by controlling shifting to implement an actual shifting period as short and as light as possible, in power-on up shift in which a driver wants to shift to an upper gear while pressing down on the acceleration pedal from within a manual range, aside from making actual shifting time different, in order to make a D range and Manual range qualitatively different in terms of shifting in a vehicle with a DCT.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
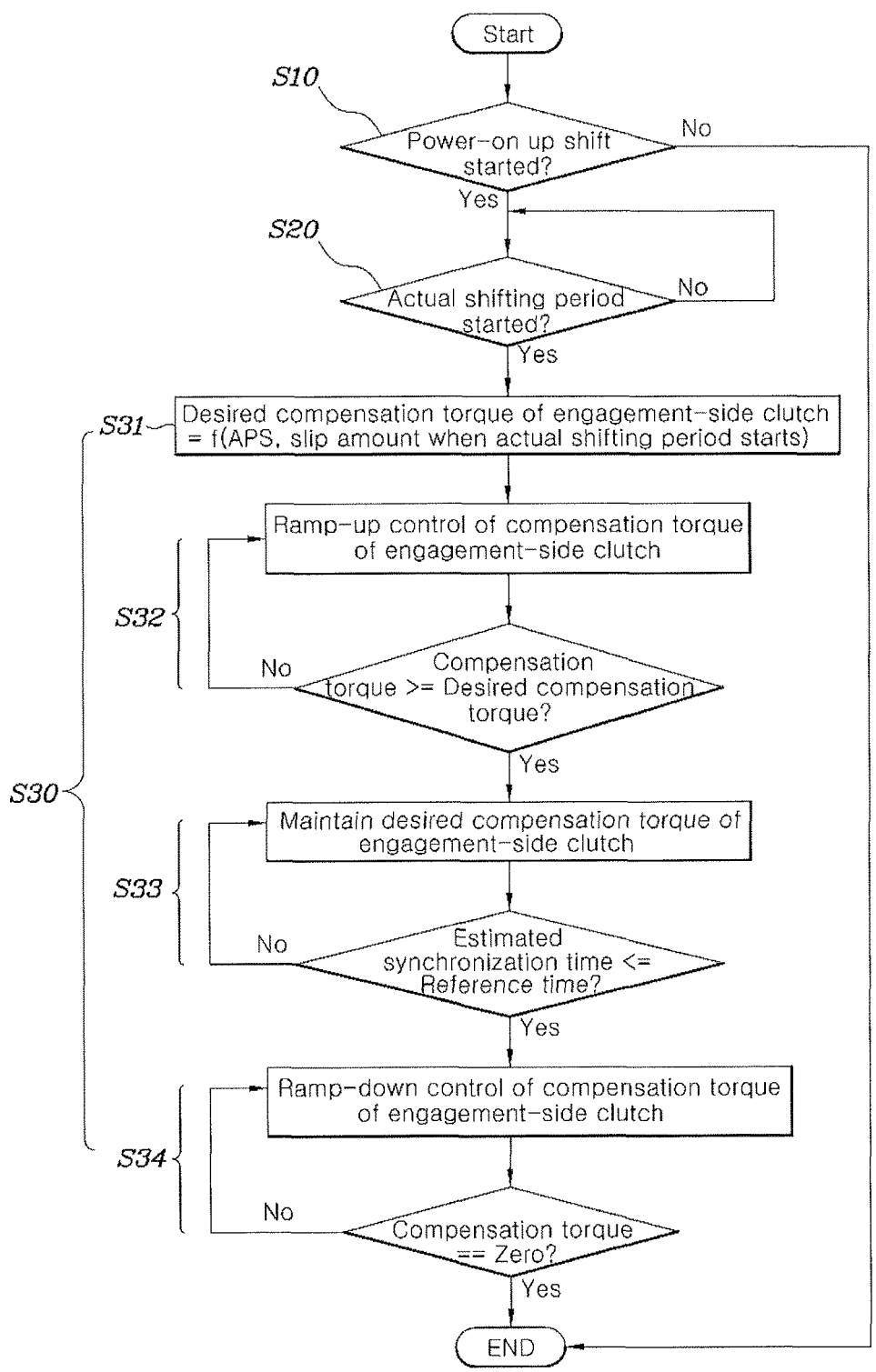
FIG. 1 is a flowchart illustrating a shifting control method for a vehicle with a DCT according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
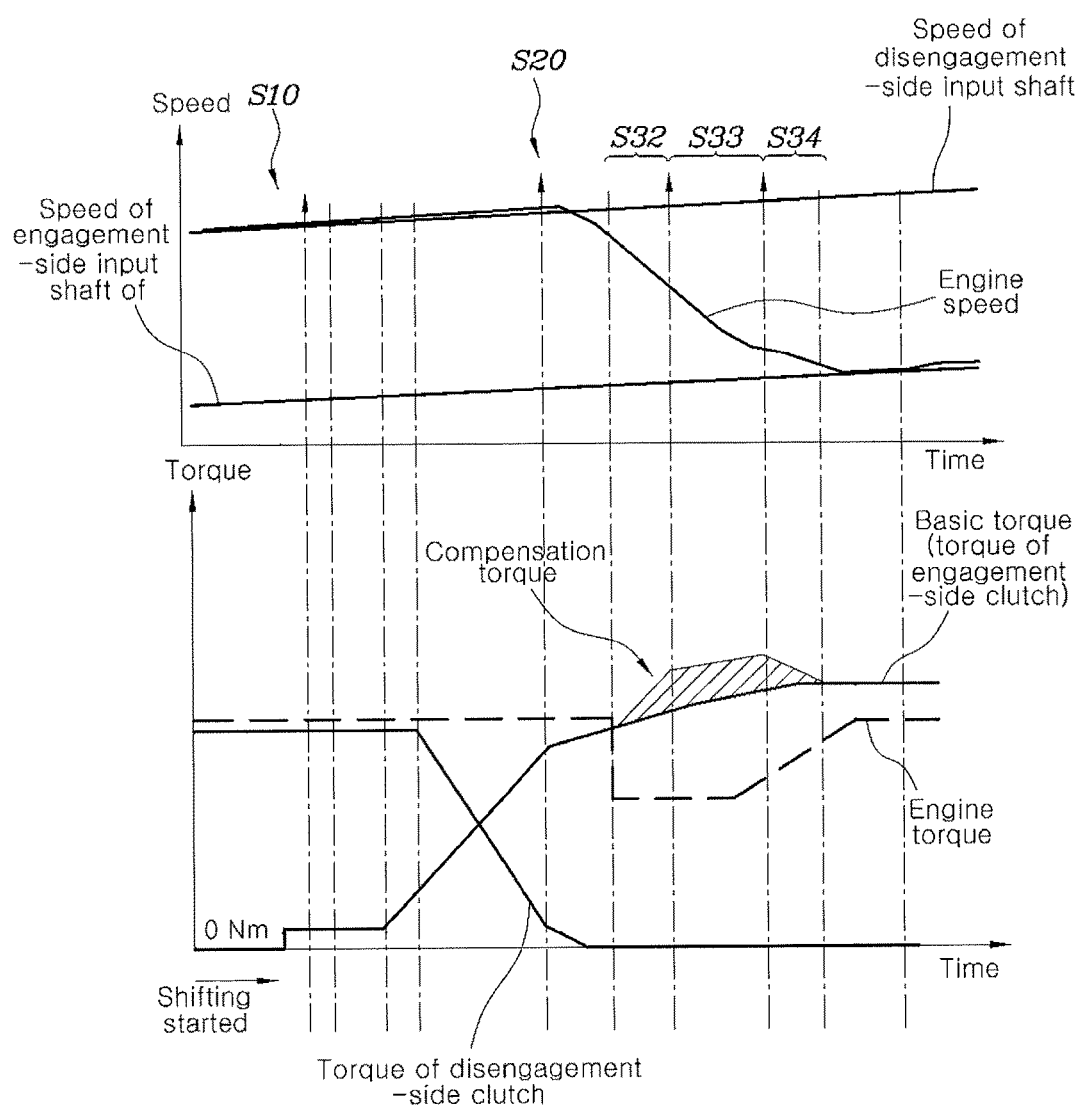
FIG. 2 is a graph illustrating the control method of the present invention.

Referring to FIGS. 1 and 2, a shifting control method for a vehicle with a DCT according to an exemplary embodiment of the present invention includes, by a controller, determining by the controller, whether a manual range power-on up shift has been started (S10), determining by the controller, whether an actual shifting period has been started, when the power-on up shift has been started (S20), and applying by the controller, additional predetermined compensation torque to basic torque applied to an engagement-side clutch, when the actual shifting period has been started (S30).

The applying of additional predetermined compensation torque (S30) ramps up the compensation torque to desired compensation torque and gradually ramps it down until shifting is finished.

That is, according to an exemplary embodiment of the present invention, when manual range power-on up shift starts, compensation torque is additionally applied to the basic torque to be applied to the engagement-side clutch in actual shifting to more quickly finish the shifting and achieve the uniquely more sporty shifting response characteristic of a DCT.

Obviously, in manual range up-shift when a driver moves a shift lever to engage a desired gear from a manual range without pressing down on an acceleration pedal, shifting is performed by applying the basic torque to the engagement-side clutch without additional compensation torque in actual shifting, unlike the present invention.

That is, shifting time is basically set short within the manual range in comparison to a D range, but when a driver moves a shift lever to shift to an upper gear with a foot pressing down on an acceleration pedal, the actual shifting time is made shorter and compensation torque is further applied to the engagement-side clutch, so shifting is more quickly performed.

For reference, the actual shifting refers to a period in which, as shown in FIG. 2, torque applied to a disengagement-side clutch is removed and torque is applied to the engagement-side clutch, so the torque values cross each other, but the rotation speed of an engine passes a torque hand-over state in which it is the same as the rotation speed of an input shaft of the disengagement side with the previous gear engaged, comes out of the rotation speed of the input shaft of the disengagement side, and is synchronized with the rotation speed of the input shaft of the engagement side with a new desired gear engaged.

The desired compensation torque depends on the degree to which an acceleration pedal is pressed down by a driver (value measured by an acceleration pedal sensor) and the amount of slip that is the difference between the rotation speed of the engine and the rotation speed of the input shaft of the engagement side when the actual shifting starts. That is, for example, the desired compensation torque may be set in proportion to the degree to which an acceleration pedal is pressed down by a driver and the slip amount.

The above-mentioned setting of the desired compensation torque may be based on the fact that as the degree to which an acceleration pedal is pressed down by a driver increases, faster shifting is required, and that as the slip amount increases, larger compensation torque is required to finish shifting more quickly.

The applying of additional predetermined compensation torque (S30), in detail, may include: calculating the desired compensation torque (S31), when the determining of whether an actual shifting period has been started (S20) determines that the actual shifting period has been started, gradually ramping up compensation torque toward the desired compensation torque (S32) calculated in the calculating of the desired compensation torque (S31), maintaining the desired compensation torque until estimated remaining synchronization time decreases to under a predetermined reference time (S33), when the compensation torque reaches the desired compensation torque, and removing the compensation torque until synchronization is finished by gradually decreasing the compensation torque (S34) after the maintaining of the desired compensation torque (S33).

The reference time that is a criterion of determining whether to maintain the desired compensation torque (S33) may be set on the basis of a level where the compensation torque becomes zero by performing the removing of the compensation torque (S34), until the rotation speed of the engine and the rotation speed of the input shaft of the engagement side are synchronized.

That is, the maintaining of the desired compensation torque (S33) is continued and the point in time at which to start the removing of the compensation torque (S34) is determined by comparing the estimated remaining synchronization time with the reference time, and all of additional compensation torque is removed before shifting is finished, thereby preventing unnecessary shifting shock.

Accordingly, the reference may be appropriately set in consideration of the time when the removing of the compensation torque (S34) is possible and prevention of shifting shock.

According to an exemplary embodiment of the present invention, it is possible to sufficiently keep the features of a vehicle with a DCT and largely contribute to improving the commercial value of a vehicle accordingly, by achieving sportier and lighter shifting characteristics that can satisfy users' expectations in manual range power-on up shift.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting control method for a vehicle with a Double Clutch Transmission (DCT), comprising:
   determining by a controller, whether a manual range power-on up shift has been started;
   determining by the controller, whether an actual shifting period has been started, when the manual range power-on up shift has been started; and
   applying by the controller, additional predetermined compensation torque to basic torque applied to an engagement-side clutch, when the actual shifting period has been started.

2. The method of claim 1, wherein the applying of the additional predetermined compensation torque ramps up the compensation torque to a desired compensation torque and ramps down the compensation torque until shifting is finished.

3. The method of claim 2, wherein the desired compensation torque is determined in accordance with a degree to which an acceleration pedal is pressed down by a driver and an amount of slip that is a difference between a rotation speed of an engine and a rotation speed of an input shaft of an engagement-side when actual shifting starts.

4. The method of claim 2, wherein the desired compensation torque is determined in proportion to a degree to which an acceleration pedal is pressed down by a driver and an amount of slip that is a difference between a rotation speed of an engine and a rotation speed of an input shaft of an engagement-side when actual shifting starts.

5. The method of claim 4, wherein the applying of the additional predetermined compensation torque includes:
   determining by the controller, the desired compensation torque, when the determining of whether the actual shifting period has been started determines that the actual shifting period has been started;
   ramping up by the controller, compensation torque toward the desired compensation torque determined in the determining of the desired compensation torque;
   maintaining by the controller, the desired compensation torque until estimated remaining synchronization time decreases to under a predetermined reference time, when the compensation torque reaches the desired compensation torque; and
   removing by the controller, the compensation torque until synchronization is finished by decreasing the compensation torque after the maintaining of the desired compensation torque.

6. The method of claim 5, wherein the reference time that is a criterion of determining whether to maintain the desired compensation torque is set on a basis of a level where the compensation torque becomes zero by performing the removing of the compensation torque, until a rotation speed of the engine and a rotation speed of the input shaft of the engagement-side are synchronized.

* * * * *